US007059519B1

(12) United States Patent
Glize

(10) Patent No.: US 7,059,519 B1
(45) Date of Patent: Jun. 13, 2006

(54) MAN/MACHINE INTERFACE METHOD AND DEVICE FOR A TICKET PROCESSING DEVICE COMPRISING A MAGNETIC STRIPE

(75) Inventor: Jean-Pierre Glize, Chatou (FR)

(73) Assignee: IER, Suresnes (FR)

( * ) Notice: Subject to any disclaimer, the term of this patent is extended or adjusted under 35 U.S.C. 154(b) by 0 days.

(21) Appl. No.: 10/009,995

(22) PCT Filed: Jun. 17, 1999

(86) PCT No.: PCT/FR99/01468

§ 371 (c)(1),
(2), (4) Date: Apr. 25, 2002

(87) PCT Pub. No.: WO00/79489

PCT Pub. Date: Dec. 28, 2000

(51) Int. Cl.
*G06K 7/08* (2006.01)

(52) U.S. Cl. ....................................... 235/449; 235/493

(58) Field of Classification Search ................ 235/449, 235/475, 476, 480, 477, 462.15, 375–386, 235/493

See application file for complete search history.

(56) References Cited

U.S. PATENT DOCUMENTS

| | | | | | |
|---|---|---|---|---|---|
| 3,917,924 | A | * | 11/1975 | Linne | 377/13 |
| 4,040,345 | A | * | 8/1977 | Adams et al. | 101/66 |
| 4,108,364 | A | * | 8/1978 | Tanaka et al. | 235/419 |
| 4,300,042 | A | * | 11/1981 | Oldenkamp et al. | 235/449 |
| 4,677,553 | A | * | 6/1987 | Roberts et al. | 463/17 |
| 4,704,518 | A | * | 11/1987 | Brunn et al. | 235/480 |
| 4,788,419 | A | * | 11/1988 | Walters et al. | 235/381 |
| 4,866,256 | A | * | 9/1989 | Morofushi | 235/433 |
| 4,878,175 | A | * | 10/1989 | Norden-Paul et al. | 705/2 |
| 4,965,437 | A | | 10/1990 | Nagai | 235/381 |
| 5,120,947 | A | * | 6/1992 | Petch et al. | 235/475 |
| 5,359,183 | A | * | 10/1994 | Skodlar | 235/493 |
| 5,450,051 | A | * | 9/1995 | Stromberg | 235/380 |
| 5,484,215 | A | * | 1/1996 | Fillod et al. | 400/120.18 |
| 5,488,223 | A | * | 1/1996 | Austin et al. | 235/375 |
| 5,493,105 | A | * | 2/1996 | Desai | 235/375 |
| 5,504,321 | A | * | 4/1996 | Sheldon | 235/492 |
| 5,564,841 | A | * | 10/1996 | Austin et al. | 400/103 |
| 5,777,315 | A | * | 7/1998 | Wilz et al. | 235/462.15 |
| 5,781,708 | A | * | 7/1998 | Austin et al. | 235/375 |

(Continued)

FOREIGN PATENT DOCUMENTS

CH 621 636 2/1981

(Continued)

*Primary Examiner*—Uyen-Chau N. Le
(74) *Attorney, Agent, or Firm*—Oblon, Spivak, McClelland, Maier & Neustadt, P.C.

(57) ABSTRACT

The invention concerns a man/machine interface method for a ticket processing device (DIS) comprising a magnetic read/write station (PIL), a thermal printing station (TT) and control means (UC), including the following steps: a) writing on the magnetic stripe of a configuration ticket at least certain operating parameters of the ticket processing device to be configured (DIS), and printing said parameters on said configuration ticket, corresponding to said configuration parameters; b) inserting the configuration ticket into the processing device to be configured; c) reading the content of the configuration ticket magnetic stripe; d) storing the configuration parameters read, thereby enabling the control means (UC) to provide the configuration for the functioning of the ticket processing device using said stored configuration parameters and an installer to be provided with a ticket configuration whereon are printed said corresponding configuration parameters.

11 Claims, 5 Drawing Sheets

U.S. PATENT DOCUMENTS

| | | | | |
|---|---|---|---|---|
| 5,791,990 | A * | 8/1998 | Schroeder et al. | 463/17 |
| 5,852,745 | A * | 12/1998 | Fontal et al. | 710/15 |
| 5,854,477 | A * | 12/1998 | Kawaji et al. | 235/493 |
| 6,031,621 | A * | 2/2000 | Binder | 235/462.13 |
| 6,032,135 | A * | 2/2000 | Molano et al. | 235/381 |
| 6,092,798 | A * | 7/2000 | Hiratuka et al. | 270/52.12 |
| 6,321,989 | B1 * | 11/2001 | Wilz et al. | 235/462.45 |

FOREIGN PATENT DOCUMENTS

| | | | |
|---|---|---|---|
| EP | 0 585 139 | | 3/1994 |
| EP | 631258 | A1 * | 12/1994 |
| EP | 0 755 786 | | 1/1997 |
| EP | 840172 | A2 * | 5/1998 |
| JP | 61049870 | A * | 3/1986 |
| JP | 03253991 | A * | 11/1991 |
| JP | 07021332 | A * | 1/1995 |
| JP | 07044736 | A * | 2/1995 |
| JP | 08293043 | A * | 11/1996 |
| JP | 08310061 | A * | 11/1996 |
| JP | 09006996 | A * | 1/1997 |
| JP | 09326052 | A * | 12/1997 |
| JP | 2002228092 | A * | 8/2002 |
| WO | WO 9805508 | A1 * | 2/1998 |

* cited by examiner

TIR2

TREF1

MAN/MACHINE INTERFACE METHOD AND DEVICE FOR A TICKET PROCESSING DEVICE COMPRISING A MAGNETIC STRIPE

BACKGROUND OF THE INVENTION

1. Field of the Invention

This invention concerns the field of man/machine interfaces for a ticket processing device comprising a magnetic stripe.

It has a particular application in the processing of transport tickets, notably air or railway tickets, comprising magnetic information.

2. Discussion of the Background

In Patents FR 88 00734 and FR 88 00733, the Applicant has already described a ticket processing device comprising an insertion station, a delivery station, a magnetic read/write station and a thermal printing station.

In this kind of ticket processing device, the installer manually programmes the different configuration parameters and parameters for adaptation of the different processing device stations, with the help of a man/machine interface formed by a keyboard and a display screen.

The Applicant has addressed the problem of providing a man/machine interface enabling in particular the automation and improvement of the man/machine dialogue, the programming and/or adaptation of a ticket processing device with a magnetic stripe.

SUMMARY OF THE INVENTION

This invention provides just such a solution to this problem.

It concerns a man/machine interface method for a ticket processing device comprising a magnetic stripe, the processing device being of the type containing a magnetic read/write station, a thermal printing station and control means.

According to a general definition of the invention, the interface method includes the following stages:

a)—write on the magnetic stripe of a configuration ticket at least certain operating parameters of the processing device to be configured, and print the said configuration parameters on the said configuration ticket, corresponding to the magnetic inscription of the said configuration parameters;

b)—insert the configuration ticket into the processing device to be configured;

c)—read the content of the configuration ticket's magnetic stripe; and d)—store the configuration parameters so read, which enables, on one hand, the control means to configure the functioning of the ticket processing device with the aid of the said configuration parameters so stored, and on the other hand, the installer to have a configuration ticket on which the corresponding said configuration parameters are printed.

Thus, thanks to the interface method according to the invention, the operation consisting of programming the operating parameters of the processing device according to the operating conditions becomes automatic, and leaves a written trace to the installer.

In practice, stage a) consists of programming the configuration ticket with the help of a chosen programming machine, including at least one magnetic read/write station and one thermal printing station and control means.

To the best advantage, the configuration ticket may be generated by any machine of the same family as that of the device to be configured, which will have been correctly programmed for a given need. After this programming on the machine to be programmed, the configuration ticket is edited by the corresponding printing station.

Preferably, the configuration ticket includes, in clear, the personalisation parameters printed on the front of the ticket, while the reflection of this information is written magnetically on the magnetic stripe of the said configuration ticket.

According to another important characteristic of the invention, the man/machine interface method can include, in an optional mode, the following stages:

1/.—capturing information relating to the activity of the ticket processing device;

2/.—storing the said information so captured; and

3/.—printing the said information so stored on a statement ticket.

For example, the information includes the description of an event, and the value of the counter associated with that event.

So, during its operational functioning, the ticket processing device is capable of recording to a permanent memory information relating to its activity and/or to any incidents detected.

Thanks to the statement ticket, the ticket processing device can edit a statement of that information on a suitable kind of statement.

As a variant, stage 3) mentioned above includes the editing of cycle and incident counters superimposed on a statement ticket representing the device's mechanism and the various elements concerned by operational functioning.

To the best advantage, the method includes in addition a stage 4) in which it is planned to write magnetically on the said statement ticket, corresponding to the thermal printing, the said statement information. This device thus enables the automatic capture during an inspection by a technician and the transport of the information to a collection station located, for example, in the maintenance workshop.

According to another aspect of the invention, in addition a man/machine interface method is planned which enables automatic adjustment to be carried out of the different mechanical parameters governing the operational performance of the basic functions of a device for processing tickets with a magnetic stripe.

In practice, the adjustment method includes the following stages:

I) insert into a ticket processing device to be adjusted a reference ticket comprising a magnetic stripe extending from one transversal edge of the ticket to the other and on the longitudinal side of the said ticket;

II) detect at least one transversal edge of the reference ticket;

III) write on the magnetic stripe of the reference ticket a sequence of elementary reference inscriptions the start of which is delivered before the arrival of the reference ticket at the magnetic read/write station and including at least one reference mark;

IV) count the number of elementary reference inscriptions so written on the magnetic stripe of the reference ticket, up to the reference mark, and deduce from that the distance between optical detection of the transversal edge of the ticket and magnetic inscription.

It must be pointed out that the distance between optical detection of the front edge of the ticket and magnetic inscription, may vary from one ticket processing device to another. Thanks to measuring this distance in accordance with the invention method, it is thus possible to ensure optimum framing of the magnetic read/write, by positioning.

Furthermore, by applying the aforementioned method for the other transversal edge of the reference ticket, it is possible to adjust the magnetic inscription density the variability of which may result from differences occurring between two ticket processing devices, in particular in the means of driving the ticket into the magnetic write area (evolute, diameter of the drive roller, belt characteristics).

To the best advantage, the acquisition or the adjustment of all parameters, peculiar to each mechanism, is condensed into a single procedure which takes place after construction of the ticket processing device or after a maintenance operation.

During this single procedure, the following elements may be adjusted automatically:

framing of the magnetic inscription;

adjustment of the magnetic inscription density;

framing of printing horizontally and vertically; and adjustment of the print density (image anamorphosis).

Density adjustment is made necessary by the variability of the ticket displacement evolute in front of the magnetic read/write and thermal printing stations.

For its part, framing adjustment is made necessary by the variability of the distance between the optical detector and the magnetic read/write station as well as between the optical detector and the thermal printing station.

To the best advantage, the adjustment procedure includes in addition a cut centring stage, in which it is planned to prepare a reference ticket comprising attenuation lines, the reference ticket being inserted into the ticket processing device to be adjusted and the reference ticket being cut at the attenuation lines.

Thus, the effective cutting position is compared visually by the operator in relation to the reference attenuation lines.

This invention is also aimed at a man/machine interface device enabling the implementation of the method according to the invention.

BRIEF DESCRIPTION OF THE DRAWINGS

Other characteristics and benefits of the invention will appear in the light of the description detailed below and the drawings in which.

DESCRIPTION OF THE PREFERRED EMBODIMENTS

The appended drawings comprise, for numerous tickets, elements of a certain nature. They may, therefore, not only be used to illuminate the description below, but also to contribute to the definition of the invention, if necessary.

Figure 1:
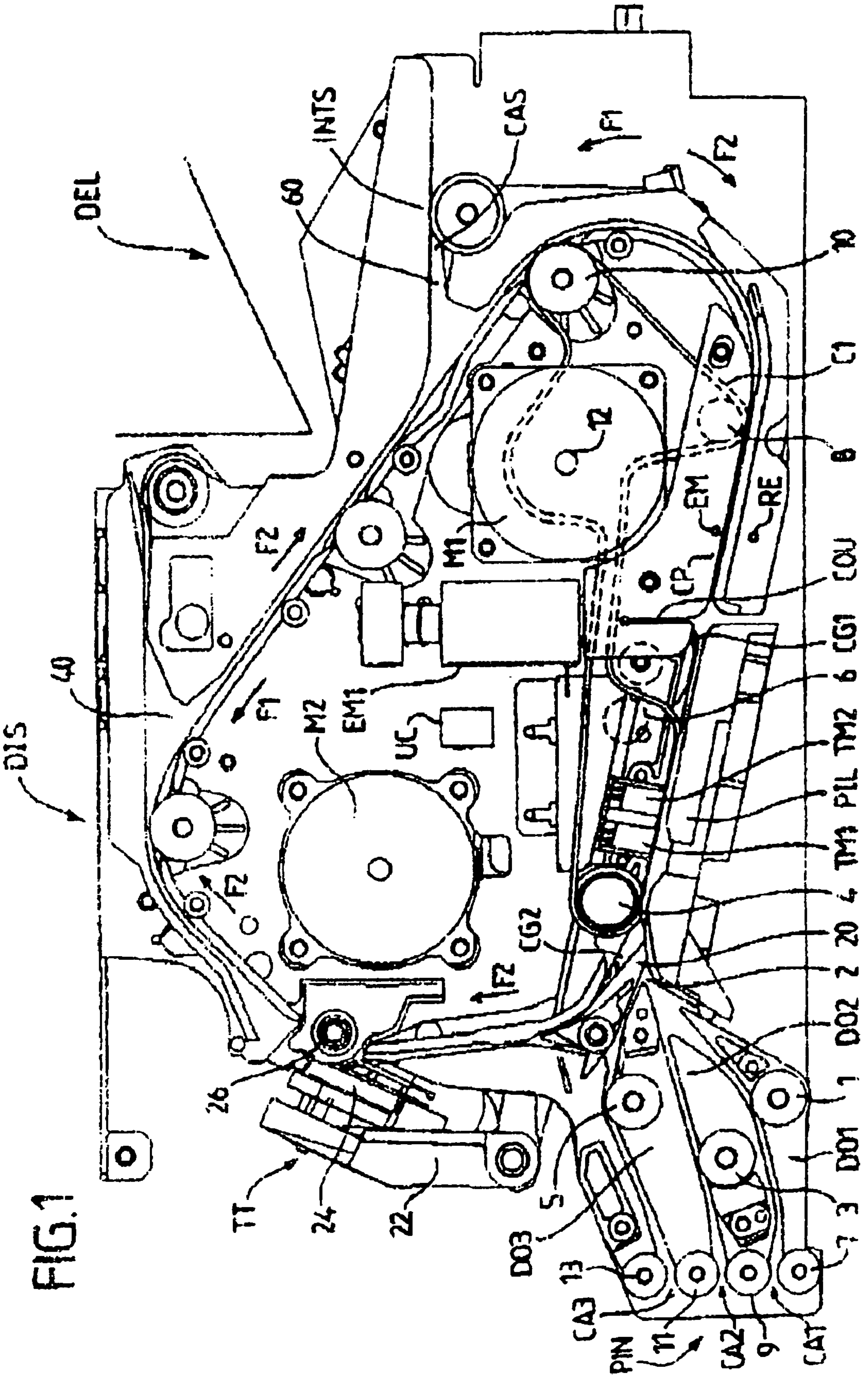
FIG. 1 is a side view diagram of a processing device according to the invention.

With reference to FIG. 1, a ticket processing device DIS has been represented, which is for example the one described in the Patent Application lodged in the name of the Applicant, on the same day as this Application, and under the title "Ticket processing device with thermal printing and magnetic read/write according to an internal trajectory in a closed circuit". To all useful effects, such a Patent Application is an integral part of this description.

In short, the ticket processing device DIS includes an insertion station PIN, a delivery station DEL, a magnetic read/write station PIL and a thermal printing station TT.

The ticket belt is directed in front of a magnetic read/write station PIL, including a first magnetic write head TM1, followed by a second magnetic read head TM2.

As a variant, the magnetic read/write station PIL comprises only one magnetic head, in this case, the band passes in front of the single magnetic head several times.

For the magnetic read/write, feed means C1, M1, are planned to be capable of feeding a ticket according to a bidirectional internal section (direction F1 or F2), going from the insertion station to a delivery station, via the magnetic read/write station.

Once the magnetic writing of information has been completed on a ticket concerned, followed by its immediate reading, the belt is driven according to a guide channel CG1 in front of a cutting station COU, according to direction F1.

As soon as the cut has been completed on the ticket concerned, the control means UC can drive the motor M1 in the direction F2, the opposite to direction F1, in order to take the ticket so cut to the thermal printing station TT.

In practice, switching means 20 are planned which enable the ticket to be directed, so magnetically read/written and cut, to the thermal printing station TT, in accordance with direction F2, in a guide channel CG2 distinct from the intake channels CA1, CA2 and CA3.

Guide channel CG2 takes the ticket into the thermal printing station TT comprising a body 22 extended by a head 24 co-operating by friction with a roller 26, fulfilling the role of an anvil for the said print head 24.

The thermal station TT is, for example, the one described in the International Patent Application lodged in the name of the Applicant, on the same day as that of this Application, and under the title "Device for processing tickets, in particular transport ones, of different formats". To all useful effects, such an Application is an integral part of this description.

The guide channel CG2 extends after the thermal printing station in accordance with direction F2 to come out at a ticket output or ticket delivery station DEL emptying into an outlet receptacle.

Switching means 40 are arranged downstream from the thermal printing station TT and upstream from the delivery station DEL in accordance with direction F2. The switching means 40 are capable, under the command of the control means UC, of directing the ticket either to the delivery station DEL or to the magnetic read/write station, in accordance with direction F2.

Preferably, it is planned to arrange in the closed circuit, according to the invention, a supplementary tickets insertion station INTS for tickets already cut, that is to say not attached to the ticket passing belt, in accordance with the attenuation lines.

In practice, the insertion station INTS comprises an intake slot 60 defining an intake channel CAS for supplying the closed circuit with tickets already cut.

Bi-directional feed means are planned for the supplementary insertion station INTS in order to bring a ticket completely into the closed circuit, according to direction F1, and to then send it, after complete insertion, to the read/write station PIL, in direction F2.

In practice, the processing unit UC controls the entry of the ticket according to direction F1 and in response to the detection of the complete insertion of the ticket into the closed circuit according to F1, the control unit can control the bidirectional processing means in order to feed the said ticket to the magnetic read/write station, according to direction F2.

According to the invention, a man/machine interface method is planned, intended to automate and improve man/machine dialogue, programming and/or adjustment of a ticket processing device DIS.

Firstly, the method according to the invention comprises the following stages:

a)—writing on the magnetic stripe of a configuration ticket at least certain operating parameters of the processing device to be configured, and printing the said configuration parameters on the said configuration ticket, corresponding to the magnetic inscription of the said configuration parameters.

b)—inserting the configuration ticket into the processing device to be configured, for example at the supplementary insertion station INTS;

c)—reading the content of the magnetic stripe on the configuration ticket; and d)—storing the configuration parameters so read.

Thanks to the method according to the invention, the control means UC are capable of configuring the functioning of the ticket processing device DIS, with the help of the said configuration parameters so stored. Furthermore, the installer has a configuration ticket TITC on which the said corresponding configuration parameters are printed.

Thus, the operation consisting of programming the operating parameters of the processing device according to operating conditions becomes automatic, and leaves a written trace to the installer.

In practice, stage a) consists of programming the configuration ticket with the help of a chosen programming machine, comprising at least a magnetic read/write station and a thermal printing station and control means.

To the best advantage, the configuration ticket TITC may be generated by any machine of the same family as that of the device to be configured, that machine having been correctly programmed for a given need. After this programming on the machine to be programmed, the configuration ticket is edited by the corresponding printing station.

Preferably, the configuration ticket comprises, in clear, the personalisation parameters printed on the front of the ticket, while the reflection of that information is written magnetically on the magnetic stripe of the said configuration ticket.

Figure 2:
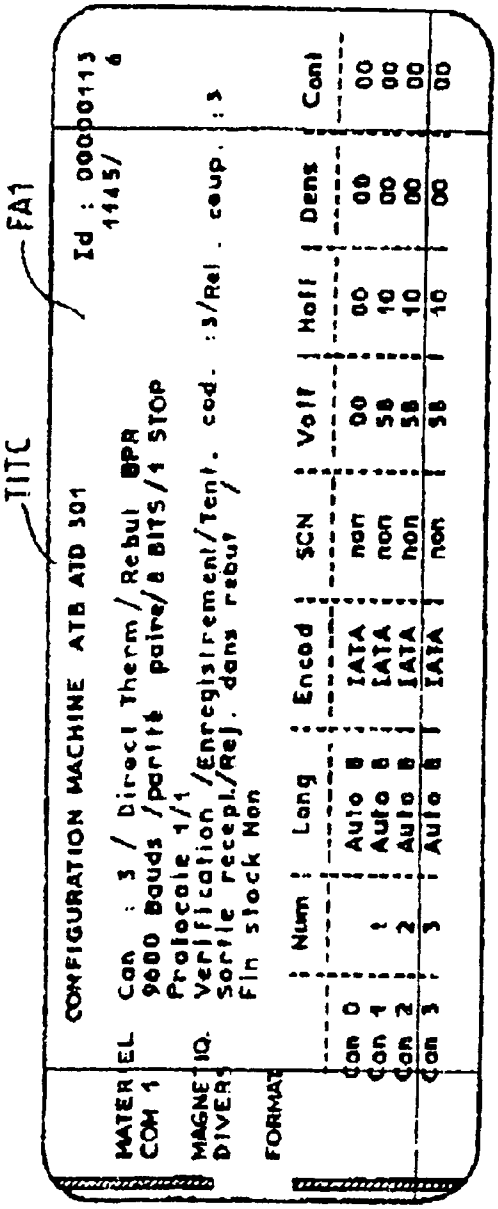
FIG. 2 shows a configuration ticket according to the invention.

With reference to FIG. 2, a configuration ticket TITC has been shown on the FA1 side of which information relating to configuration parameters is printed. On the other side, opposite the FA1 side, a magnetic stripe on the configuration ticket contains the magnetic inscriptions corresponding to the printed information.

For example, the information printed on the ticket TITC relates to equipment (3 band intake channels, direct thermal printing, a reject station), communication protocol (9600 bauds, even parity, 8 bits, 1 stop), magnetic reading/writing, and various other parameters.

Secondly, the man/machine interface method can include an optional mode which comprises the following stages:

1/.—capturing information relating to the activity of the ticket processing device;

2/.—storing the said information so captured; and

3/.—printing on a statement ticket the said information so stored.

For example, the information includes the description of an event, and the value of the counter associated with that event.

So, during operational functioning, the ticket processing device is capable of recording to a permanent memory (not represented) the information relating to its activity and/or to any incidents detected.

Thanks to the statement ticket, the ticket processing device can edit a statement of that information on an appropriate type of statement.

Figure 3:
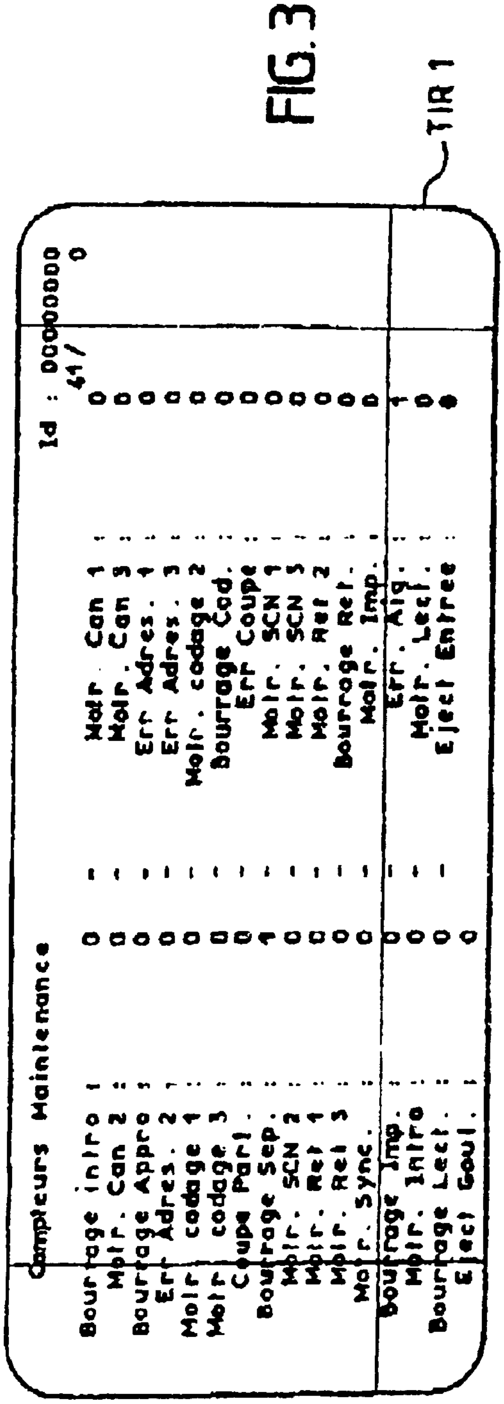
FIG. 3 represents a statement ticket showing the maintenance counters of a ticket processing device according to the invention.
Figure 4:
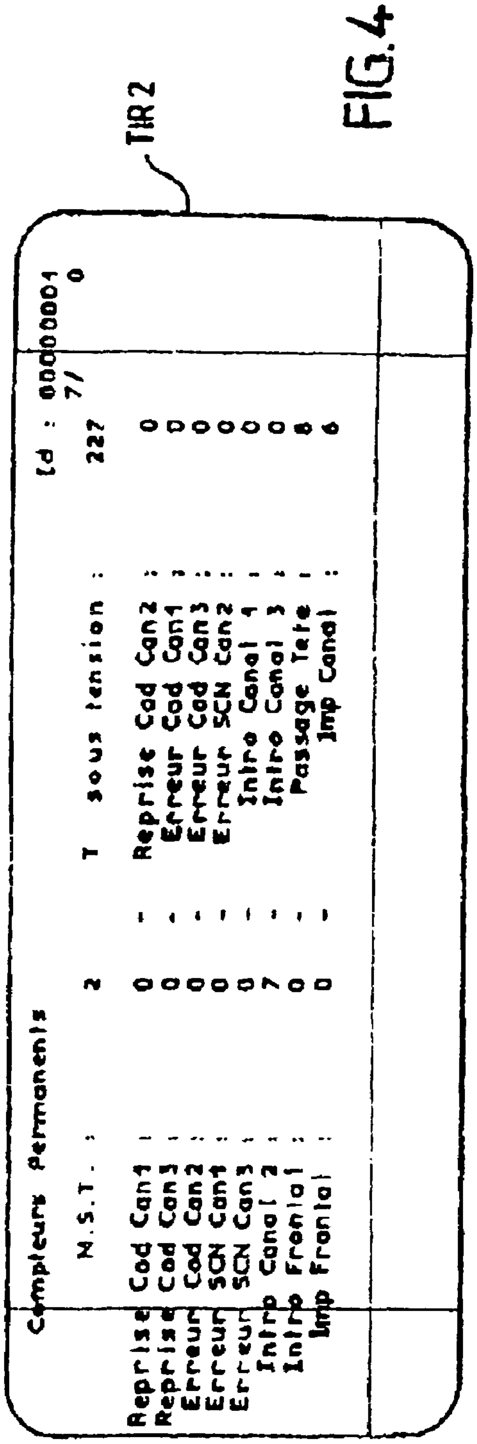
FIG. 4 represents a statement ticket relating to the maintenance counters according to the invention.

With reference to FIGS. 3 and 4, the statement ticket TIR1 or TIR2 comprises the editing of the cycle and incident counters superimposed on a statement ticket representing the device's mechanism and the different elements concerned by operational functioning.

To the best advantage, it is planned in addition to write magnetically on the said statement ticket TIR1 or TIR2, corresponding to the thermal printing, the said statement information. This arrangement thus enables the automatic capture during inspection by a technician and the transport of the information to a collecting station situated, for example, in the maintenance workshop, or formed by a micro-computer equipped with a scanner and connected via a communication network to an appropriate server.

Figure 5:
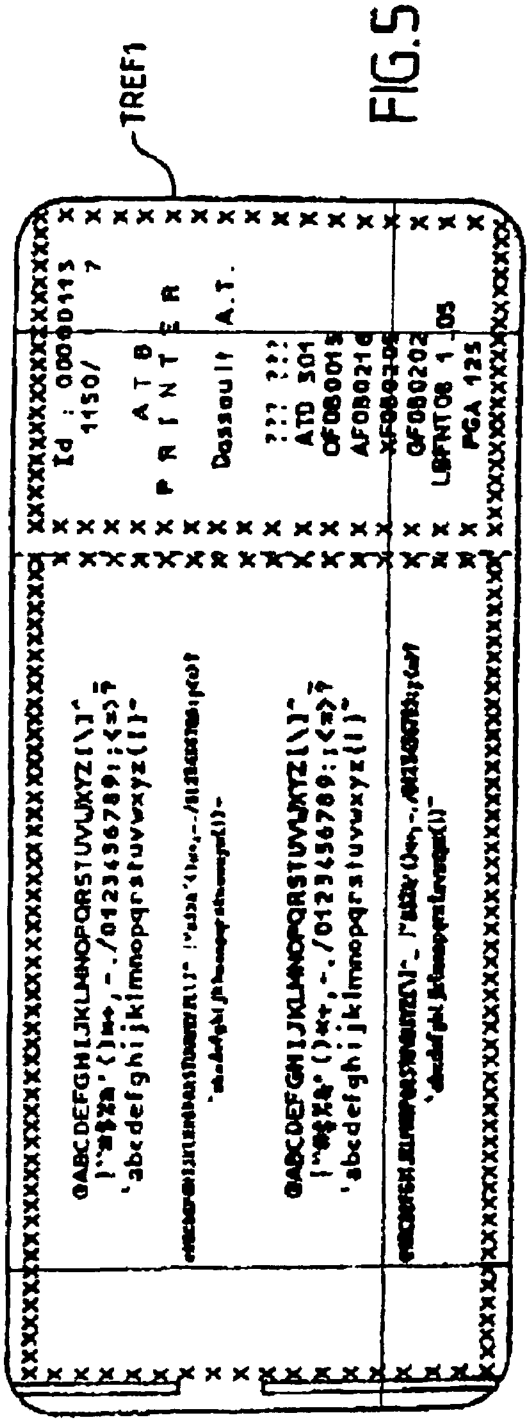
FIG. 5 represents a reference ticket relating to the thermal printing according to the invention.

With reference to FIG. 5, several fonts are printed on a reference ticket TREF1 to check the thermal printing quality according to the said fonts.

Figure 6:
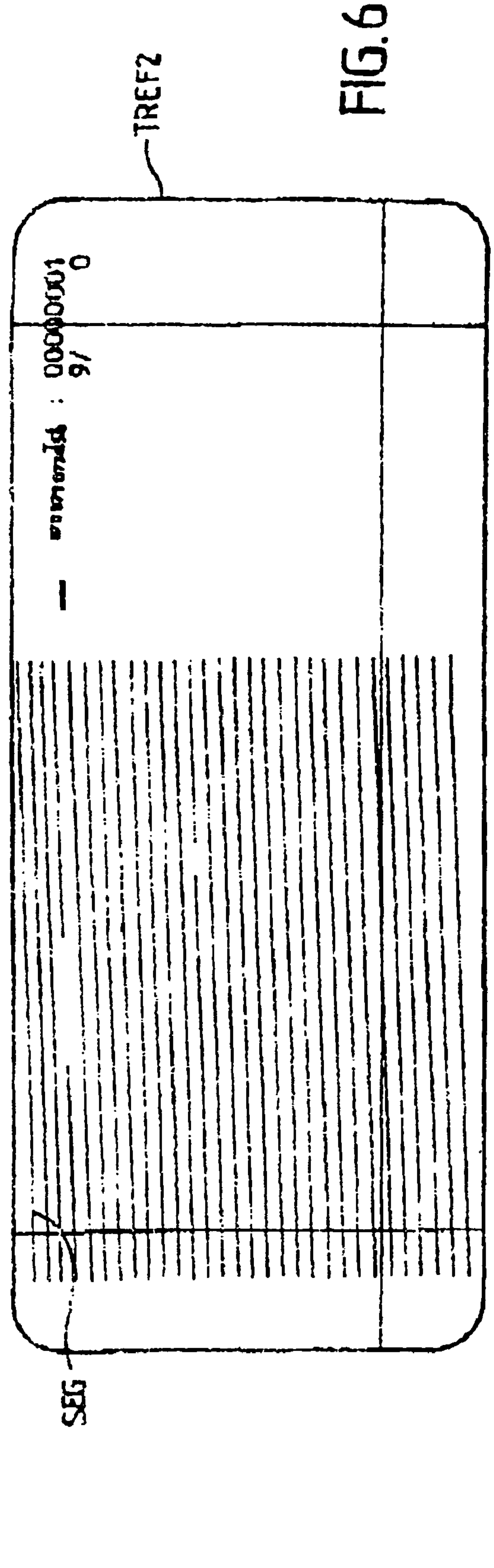
FIG. 6 represents another reference ticket relating to the thermal printing according to the invention.

With reference to FIG. 6, a sequence of elementary segments SEG are printed on a reference ticket TREF2, each representing the activity of a heating element of the print head described in the International Patent Application lodged in the name of the Applicant, on the same day as that of this Application, and under the title "Device for processing tickets, in particular transport ones, of different formats".

Thus the activity of each heating element is checked visually and immediately. On the right part of the reference ticket TREF2, the order number of the heating element declared out of action by the measuring means (not represented) is indicated.

Thirdly, in addition a man/machine interface method is planned enabling automatic adjustment to be carried out of different mechanical parameters governing the operational performance of basic functions of a device for processing tickets with a magnetic stripe.

Figure 7:
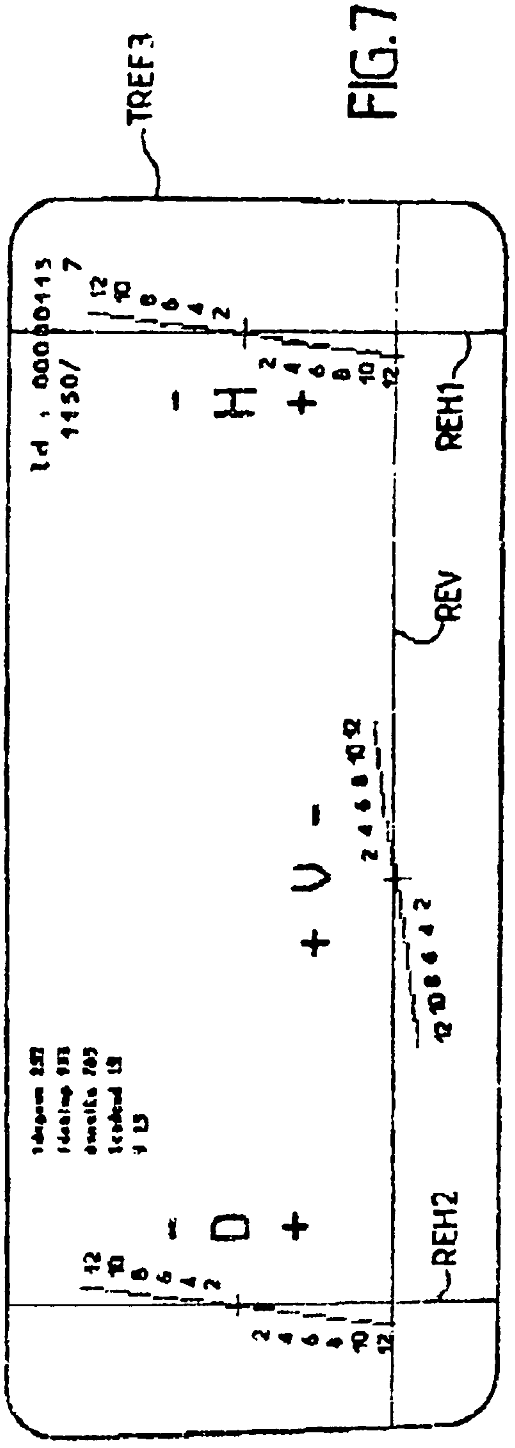
FIG. 7 represents an adjustment ticket showing the framing of the thermal printing on horizontal, vertical and density scales according to the invention.

In practice, with reference to FIG. 7, the thermal printing adjustment method comprises the following stages:

i) preparing a reference thermal printing ticket TREF3 comprising at least one printed reference mark (here three reference marks REH1, REV and REH2 relating respectively to the horizontal H, vertical V framing of the thermal printing, and to the density D of the thermal printing);

ii) inserting into a ticket processing device to be adjusted, the reference thermal printing ticket TREF3;

iii) printing at least one reference scale on the reference thermal printing ticket TREF3 in relation to the reference mark REH1, REH2 or REV; and iv) indicating the value of coincidence between an element of the reference scale H, V or D, and the reference mark REH1, REH2 or REV.

To the best advantage, the acquisition or adjustment of all parameters, peculiar to each mechanism, is condensed into a single procedure carried out after construction of the ticket processing device, after a maintenance operation, or after noticing a drift of one of the ticket processing device elements according to the invention.

Figure 8:
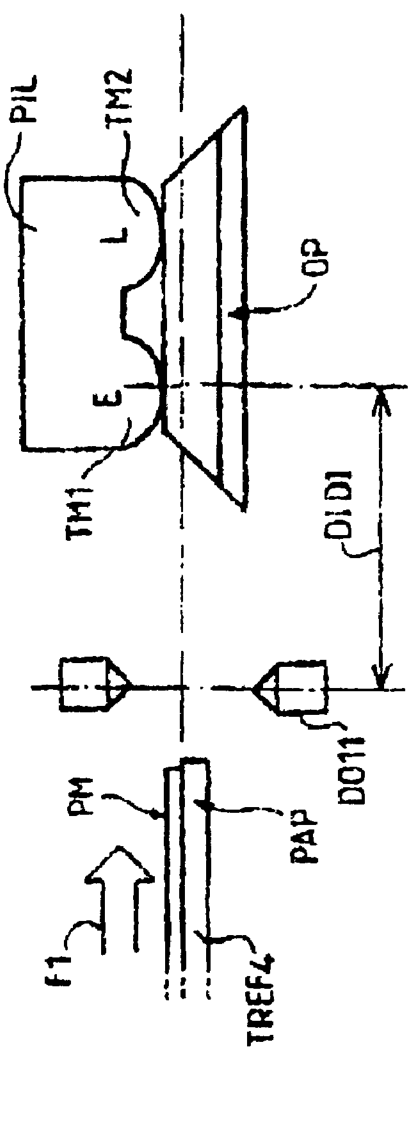
FIG. 8 represents, diagrammatically, the optical detector and the magnetic write head of the device according to the invention.
Figure 9:
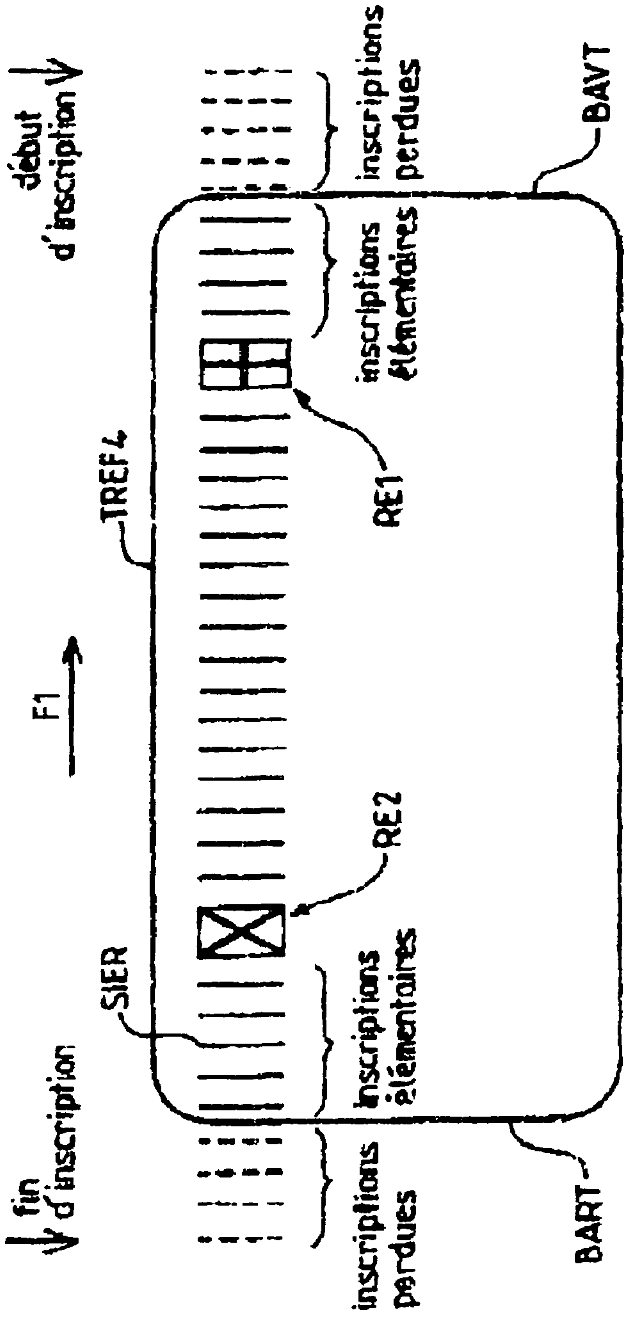
FIG. 9 represents a reference ticket enabling the distance to be measured between the optical detector and the magnetic write head of FIG. 8.

During this single procedure, the following elements may be adjusted automatically;

framing of the magnetic inscription and of the density of the magnetic inscription (FIGS. 8 and 9);

framing of the printing horizontally H and vertically V (FIG. 7); and adjustment of the print density D (image anamorphosis, FIG. 7).

With reference to FIG. 7, the reference scales relating to the horizontal framing H, vertical framing and density adjustment D, each comprise a graduated scale with a zero separating a positive part whose graduations are numbered in 2s, and a negative part whose graduations are also numbered in 2s.

To the best advantage, the adjustment procedure comprises in addition a cutting position centring stage, in which it is planned to check the actual cutting position, the reference ticket being inserted into the ticket processing device to be adjusted, and the operator comparing visually the cut in relation to the attenuation lines.

To the best advantage, the framing of the magnetic inscription is also adjusted according to the invention method (to the best advantage during the same procedure as that of thermal printing).

In practice, the magnetic inscription framing adjustment method comprises the following stages:

I) inserting into a ticket processing device to be adjusted a reference ticket comprising a magnetic stripe extending from one transversal edge of the ticket to the other, and on the longitudinal side of the said ticket;

II) detecting at least one transversal edge of the reference ticket;

III) writing on the magnetic stripe of the reference ticket a sequence of elementary reference inscriptions the start of which is delivered before the arrival of the reference ticket at the magnetic read/write station and comprising at least one reference mark;

IV) counting the number of elementary reference inscriptions so written on the magnetic stripe of the reference ticket, up to the reference mark, and deducing from that the distance between optical detection of the transversal edge of the ticket and the magnetic inscription.

It must be pointed out that the distance between optical detection of the front edge of the ticket and the magnetic inscription may vary from one device to another. Thanks to measuring that distance in accordance with the invention method, it is thus possible to ensure optimum framing of the magnetic reading/writing, by positioning.

Furthermore, by applying the aforementioned method for the other transversal edge of the reference ticket, with the aid of another reference mark placed in the sequence of elementary inscriptions following the first reference mark, it is possible to adjust the magnetic inscription density.

With reference to FIGS. 8 and 9, the implementation of this method uses a device which comprises the following means:

means suitable for preparing a reference ticket TREF4, on paper PAP, comprising a magnetic stripe PM extending from one transversal edge BAVT to the other BART of the ticket, and on the longitudinal side of the said ticket;

means DO11 for detecting at least one transversal edge BAVT of the reference ticket TREF4;

means TM1 for writing on the magnetic stripe PM of the reference ticket TREF4, a sequence of elementary reference inscriptions SIER whose start is delivered before the arrival of the reference ticket TREF4 at the write station TM1 and comprising at least one reference mark RE1;

means UC for counting the number of elementary reference inscriptions SIER so written on the magnetic stripe PM of the reference ticket TREF4, up to the reference mark RE1, and deducing from that the distance DIDI between optical detection DO11 of the transversal edge of the ticket and the magnetic inscription TM1.

For the other transversal edge of the reference ticket BART, it is planned to apply the aforementioned method using in addition another reference mark RE2 placed in the sequence of elementary inscriptions SIER following the first reference mark RE1.

Counting of the elementary inscriptions for the two edges BAVT and BART of the ticket enables adjustment of the magnetic inscription density.

In practice, the detection means DO11 comprise an optical detector mounted upstream from the magnetic read/write station according to direction F1. This optical detector is used to start the magnetic read/write. For example, this optical detector is the one which participates in thickness detection as described in the International Patent Application lodged in the name of the Applicant, on the same day as that of this Application, and under the title "Ticket processing device with thickness detector". To all useful effects, such an Application is an integral part of this description.

To the best advantage, innovations are also made to the operation and monitoring of the functioning of the ticket processing device.

For example, the motivity of each ticket feed element is monitored.

For the purposes of maintenance checks, it is possible, according to the invention, to implement a checking stage in which the elementary movements of magnetic read/write, cutting, belt return to the supplies stock, and thermal printing are proceeded with function by function and/or code line by code line.

The invention claimed is:

1. Man/machine interface method for ticket processing device including a magnetic read/write station, a thermal printing station, and a controller, comprising:

a) writing to a magnetic stripe of a configuration ticket at least certain configuration parameters of the ticket processing device to be configured, and visibly printing the configuration parameters on the configuration ticket, corresponding to magnetic inscription of the configuration parameters;

b) inserting the configuration ticket into the processing device to be configured;

c) reading contents of the magnetic stripe of the configuration ticket; and d) storing the read configuration parameters, which enables the controller to configure functioning of the ticket processing device with aid of the stored configuration parameters, and which enables an installer to have the configuration ticket on which the corresponding configuration parameters are visibly printed;

e) inserting into a ticket processing device to be adjusted a reference ticket comprising a magnetic stripe extending from transversal edges of the reference ticket and on a longitudinal side of the ticket;

f) detecting a first transversal edge of the reference ticket;

g) writing on the magnetic stripe of the reference ticket a sequence of elementary reference inscriptions, a start of which is delivered before an arrival of the reference ticket at the magnetic read/write station and comprising a reference mark; and h) counting a number of the written elementary reference inscriptions on the magnetic stripe of the reference ticket, up to the reference mark, and deducing from that a distance between optical detection of the transversal edge of the reference ticket and the magnetic inscription.

2. Method according to claim 1, wherein step a) includes programming the configuration ticket with the aid of a chosen programming machine, comprising at least a magnetic read/write station, a thermal printing station, and a controller.

3. Method according to claim 1, further comprising:

1) capturing information relating to activity of the ticket processing device;

2) storing the captured information; and 3) printing on a statement ticket the stored capture information.

4. Method according to claim 3, wherein step 3) comprises editing of cycle and incident counters superimposed on the statement ticket representing the device's mechanism and elements concerned by operational functioning.

5. Method according to claim 3, further comprising step 4) planning to write on the statement ticket, corresponding to the thermal printing, the statement information.

6. Method according to claim 1, further comprising:

i) preparing a thermal printing reference ticket comprising at least one printed reference mark relating to horizontal, vertical framing of thermal printing or to density of a thermal print;

ii) inserting into a ticket processing device to be adjusted the thermal printing reference ticket;

iii) printing at least one reference scale on the thermal printing reference ticket in relation to the reference mark; and iv) indicating a value of coincidence between an element of the reference scale and the reference mark.

7. Method according to claim 1, further comprising a cutting position centering step, of planning to prepare a reference ticket comprising attenuation lines, the reference ticket being inserted into the ticket processing device to be adjusted and the cutting position being compared visually in relation to attenuation lines.

8. Method according to claim 1, further comprising a checking step in which elementary movements of the device are proceeded with function by function and/or code line by code line.

9. Man/machine interface device for ticket processing comprising a magnetic read/write station, thermal printing station, control means, means for writing on a magnetic stripe of a configuration ticket at least certain configuration parameters of a ticket processing device to be configured, and means for visibly printing on the configuration ticket, corresponding to a magnetic programming, the configuration parameters;

wherein the read/write station of the ticket processing device is configured to read contents of the magnetic stripe of the configuration ticket inserted into the ticket processing device to be configured; and wherein the control means comprise storage means configured to store the read configuration parameters, which enables the control means to configure functioning of the ticket processing device with the aid of the stored configuration parameters, and which enable the installer to have the configuration ticket on which the corresponding configuration parameters are visibly printed, and further comprising:

means for preparing a reference ticket comprising a magnetic stripe extending from transversal edges of the ticket and on a longitudinal side of the ticket;

means for detecting a first transversal edge of the reference ticket;

means for writing on the magnetic stripe of the reference ticket a sequence of elementary reference inscriptions, a start of which is delivered before arrival of the reference ticket at the magnetic write station and comprising a reference mark; and means for counting a number of elementary reference inscriptions written on the magnetic stripe of the reference ticket, up to the reference mark, and deducing from that a distance between optical detection of the transversal edge of the ticket and the magnetic inscription.

10. Device according to claim 9, further comprising means configured to note information relating to activity of the ticket processing device, the storage means being configured to store the noted information, and the printing station configured to print onto a statement ticket the stored information.

11. Device according to claim 10, wherein the magnetic read/write station is configured to write on the statement ticket, corresponding to the thermal printing, the statement information.

* * * * *